United States Patent Office 2,741,633
Patented Apr. 10, 1956

2,741,633

SEPARATION OF ISOPHTHALIC AND TEREPHTHALIC ACIDS

Art C. McKinnis and John L. Bills, Long Beach, Calif., assignors to Union Oil Company of California, Los Angeles, Calif., a corporation of California No Drawing. Application November 17, 1952,
Serial No. 321,049

4 Claims. (Cl. 260—525)

This invention relates to a solvent extraction process for separating mixtures of isophthalic and terephthalic acids. The separation of these benzene dicarboxylic acids to obtain the pure meta- and para-isomers is a difficult problem. Phthalic acid, the ortho-isomer, is readily separated from the meta- and para-isomers since it alone forms an anhydride. However, the usual physical and chemical methods are not effective for separating isophthalic from terephthalic acid because of their very similar chemical and physical properties. Heretofore, one method for separating these acids has involved forming the alkyl esters of the acids, fractionating the esters, and hydrolyzing the individual ester fractions. Alternatively the isophthalic acid may be selectively esterified without esterifying substantial amounts of terephthalic acid, and the unesterified terephthalic acid separated as such from the esterification mixture. Still another method of separation by esterification involves completely esterifying and then selectively saponifying whereby the terephthalic acid is preferentially hydrolyzed. All of these esterification methods involve an economically undesirable number of steps.

The process described herein avoids the disadvantages involved in the above esterification methods by providing a solvent extraction procedure utilizing solvents which preferentially dissolve isophthalic acid. Specifically the solvents consist of aliphatic, water-soluble hydroxy compounds such as methanol plus a minor proportion of water to modify the relative solubility of the two acids and to inhibit esterification. It is well known that isophthalic acid is more soluble in methanol and other alcohols than is terephthalic acid. However, the solvents employed herein are chosen to provide a more favorable effective solubility ratio of isophthalic to terephthalic acids. This ratio of relative solubilities is an indication of the selectivity of the solvent. When pure methanol is employed it is found that appreciable esterification may take place in the extract, resulting in an unfavorable effective solubility ratio of the two acids. Terephthalic acid in methanol solution is found to undergo monoesterification at a rate approximately four times that of isophthalic acid, and since each half-ester is considerably more soluble than the corresponding acid, the effective ratio of terephthalic to isophthalic acid going into solution is higher than would be the case if no esterification took place. This effect is greatly accentuated at higher temperatures, e. g. above 50° C., and these temperatures are ordinarily desirable to obtain maximum capacity of the solvent for the isophthalic acid. It is therefore highly desirable to prevent esterification during the extraction without at the same time unduly impairing the capacity of the solvent.

The present invention embraces our discovery that esterification can be effectively inhibited and maximum selectivity obtained by employing an alcoholic solvent containing between about 5% and 35% water, and that this solvent may be employed at high temperatures, e. g. between 50–150° C., thereby increasing its capacity to a commercially practicable range without effecting significant esterification.

Another important factor in solvent extraction procedures is the synergistic effect of the solutes themselves upon their relative and absolute solubilities in the solvent. This factor is often independent of the individual solubilities of the components. Ordinarily, when two chemically similar organic materials are being separated by solvent extraction, it is found that if the solvent is saturated with one component, the saturated solvent will dissolve more of the other component than would the pure solvent. This is one disadvantage of solvent extraction procedures in general. In the present case, however it is found quite unexpectedly that an opposite and favorable synergistic effect is obtained. Dissolved isophthalic acid in water-methanol mixtures is found to repress the solubility of terephthalic acid therein. This phenomenon may be put to practical advantage by limiting the ratio of solvent to isophthalic acid in such manner as to insure that it is saturated or nearly saturated with isophthalic acid, thereby obtaining a maximum selectivity for isophthalic acid. In this manner the solubility ratio of isophthalic acid to terephthalic acid may be raised to between 20 and 50, depending upon the temperature employed.

From the above discussion it is clear that the primary objective of this invention is to provide a solvent for the separation of isophthalic and terephthalic acids which exhibits a maximum selectivity and an optimum relationship between selectivity and capacity.

Another object of the invention is to provide optimum temperature ranges for employing the solvent.

Another object is to still further increase the selectivity of the solvent by appropriately limiting the ratio of solvent to isophthalic acid.

A further object is to avoid chemical reactions such as esterification between solvent and solute.

All of these general objectives are directed toward obtaining a separation of isophthalic and terephthalic acids by solvent extraction whereby each acid is obtained in maximum purity.

The aromatic dicarboxylic acids, particularly terephthalic acid, have recently become highly important commercial materials by virtue of their use in the manufacture of certain synthetic polymers such as Dacron. In the past, terephthalic acid has generally been manufactured by the controlled oxidation of pure para-xylene. Such processes, as a practical matter, are usually performed in two separate stages, the first stage involving low temperature catalytic oxidation of the para-xylene to para-toluic acid and the second stage involving a higher temperature, liquid phase, non-catalytic oxidation of the toluic acid to terephthalic acid. This process is economically undesirable in that it requires as the starting material substantially pure para-xylene.

Para-xylene is ordinarily obtained as a by-product from certain petroleum fractions, especially reformate fractions obtained by the hydroforming of naphthenic petroleum fractions in the presence of certain catalysts such as cobalt molybdate or platinum. From these aromatic fractions may be obtained, as a close boiling cut, a mixture of meta-, para-, and ortho-xylene and ethylbenzene, which mixture boils between about 135° C. to 145° C. The ortho-xylene is the highest boiling material, boiling at 144° C. and is hence ordinarily removed by fractional distillation. The ethylbenzene may also be removed by efficient fractional distillation. However, the remaining mixture of meta- and para-xylene is difficult to separate into the pure components. A great variety of methods have been proposed for separating these isomers, but all the known methods are difficult and expensive. At present the most practical commercial method consists in repeated fractional crystallization. However, this method requires the use of very low temperatures and a large number of crystallization stages in order to obtain pure para-xylene. Other methods which have been proposed, such as selective sulfonation, have never been commercially adopted.

This invention obviates the difficulties involved in the xylene separation problem by providing an economical method for separating the oxidation products of the para-xylene-meta-xylene mixture.

As indicated above the invention is based primarily upon the use of certain specific solvents for selective extraction, which solvents consist of an aliphatic, water-soluble alcohol and from about 5% to 35% water. The alcohols which may be employed include for example methanol, ethanol, propanol, isopropanol, butanol, ethylene glycol, 1,3-propylene glycol, 1,2-propylene glycol, diethylene glycol, glycerol, etc. It will be seen that these alcohols include primarily the mono- and di-hydroxy alkanes containing from 1 to 3 carbon atoms. In all cases the selectivity of these solvents for isophthalic acid is increased by mixing therewith the indicated proportions of water and extracting at high temperatures, e. g. between 50° C. and 150° C. The upper limit of 35% water insures that the solvent capacity for isophthalic acid is not unduly impaired, and high-temperature extraction further increases the solvent capacity. The relationship between solvent capacity and selectivity at different temperatures may be illustrated by the following example.

EXAMPLE I

The individual solubilities of isophthalic acid and terephthalic acid in 100% methanol and in an 85% methanol-15% water mixture were determined at a series of temperatures by forming saturated solutions of the respective acids at each temperature, in each solvent, and titrating aliquots of the saturated supernatant solutions. The results were as follows:

Table

| Solvent | Temp., °C. | Acid | Dissolved Acid, gms./100 ml. Solvent | Wt. ratio, ipa-tpa |
|---|---|---|---|---|
| 100% Methanol | 10 | ipa | 1.1 | 13.7 |
|  | 10 | tpa | 0.08 |  |
|  | 25 | ipa | 1.7 | 15.5 |
|  | 25 | tpa | 0.11 |  |
|  | 35 | ipa | 2.0 | 13.3 |
|  | 35 | tpa | 0.15 |  |
|  | 55 | ipa | 3.0 | 14.3 |
|  | 55 | tpa | 0.21 |  |
|  | 75 | ipa | 4.4 | 12.1 |
|  | 75 | tpa | 0.33 |  |
| 85% Methanol, 15% Water | 10 | ipa | 0.7 | 10 |
|  | 10 | tpa | 0.07 |  |
|  | 25 | ipa | 1.0 | 10 |
|  | 25 | tpa | 0.1 |  |
|  | 35 | ipa | 1.3 | 11.8 |
|  | 35 | tpa | 0.11 |  |
|  | 55 | ipa | 2.3 | 19.2 |
|  | 55 | tpa | 0.12 |  |
|  | 75 | ipa | 3.8 | 22.4 |
|  | 75 | tpa | 0.17 |  |

The above data shows that adding 15% of water to the methanol solvent only slightly decreases its capacity. It also indicates that there is a favorable shift in selectivity at high temperatures with the methanol-water solvent as compared to the 100% methanol solvent.

The above example shows the relative solubilities of the individual acids in the respective solvents; it does not indicate what the relative or absolute solubilities would be in the presence of both acids. An illustrative determination of these latter factors was carried out as follows:

EXAMPLE II

A sample of the 85% methanol-15% water solvent employed in Example I was saturated with isophthalic acid at room temperature (approximately 27° C.). The saturated solution was then separated from the undissolved solid, and a portion thereof further saturated with terephthalic acid at the same temperature. Aliquots of the isophthalic acid-saturated and the isophthalic acid-terephthalic acid-saturated solutions were then titrated to determine total acidity. The difference in total acidity showed that only about 0.048 gram of terephthalic acid per 100 ml. of solvent had been dissolved. This is less than half the amount of terephthalic acid which will dissolve in the pure solvent at this temperature, as shown in Example I. Therefore, the actual selectivity of 85% methanol-15% water for isophthalic acid from a mixture thereof with terephthalic acid is approximately doubled by insuring that the solvent is saturated with isophthalic acid.

When the above procedure is repeated using pure methanol as solvent, it is found that the isophthalic acid saturated methanol dissolves substantially the same amount of terephthalic acid as does the pure methanol. Therefore, no improvement in selectivity is obtained by saturating methanol with isophthalic acid, the amount of terephthalic acid dissolved therein being simply a function of temperature and total volume of solvent.

Those skilled in the art will readily understand the application of the above data to the actual extraction procedures. Any method commonly employed in the art for solvent extraction of a solid with a liquid may be employed. For example the solvents may be repeatedly percolated through a bed of the mixed acids, or a slurry may be formed and separated by filtration or centrifuging into an extract and a solid residue fraction. The residue may then be washed with additional quantities of solvent until it is substantially free from isophthalic acid. In this manner substantially 100% pure terephthalic acid may be obtained.

The extract may be treated in any desired manner for recovery of the isophthalic acid, e. g. the solvent may be distilled and recovered leaving a solid residue of isophthalic acid. The isophthalic acid recovered in this manner may be from about 90–95% pure, even under adverse operating conditions. When operating under the preferred conditions, i. e. temperatures from about 50–150° C. and solvent-to-isophthalic acid ratios from about 10 to 40 ml. per gram, the isophthalic acid recovered may be from 95–98% pure. The following example is cited by way of illustration, and should not be considered as limiting.

EXAMPLE III

A mixture consisting of 50 gms. isophthalic acid and 50 gms. terephthalic acid is placed in a flask and 1450 ml. of an 85% methanol-15% water mixture is added. The mixture is heated and agitated at 70° C. for about one-half hour and then filtered. The filter cake is washed with 100 ml. of the solvent at the same temperature and the wash liquid is separately collected. Upon distillation of the extract filtrate, about 50 gms. of 97+% pure isophthalic acid is obtained. The washed filter cake consists of 47 gms. of 99+% pure terephthalic acid. The wash liquor contains about 3 gms. of mixed acids, most of which is isophthalic acid.

By substituting other alcohols such as ethanol, propanol, isopropanol, ethylene glycol, etc. for the methanol of the above example, similar results are obtained. Obviously many variations in the above procedures will occur to those skilled in the art, and they should therefore not be considered as limiting. The true scope of the invention is intended to be embraced by the following claims.

We claim:

1. A process for separating a mixture of isophthalic acid and terephthalic acid which comprises extracting said mixture at a temperature between 50° C. and 150° C. with a solvent consisting essentially of between 65% and 95% of an aliphatic water-soluble alcohol and between 5% and 35% of water, said alcohol being selected from the class consisting of mono- and di-hydroxy alkanes containing from 1 to 3 carbon atoms, continuing said extraction until substantially pure terephthalic acid remains as residue, separating an extract rich in isophthalic acid from said terephthalic acid residue, and recovering isophthalic acid from said extract.

2. A process as defined in claim 1 wherein said solvent is employed in a ratio of between 10 and 40 ml. per gram of isophthalic acid in said mixture.

3. A process for separating a mixture of isophthalic acid and terephthalic acid which comprises extracting said mixture at a temperature between 50° C. and 150° C. with a solvent consisting essentially of between 65% and 95% of methanol and between 5% and 35% of water, continuing said extraction until substantially pure terephthalic acid remains as residue, separating an extract rich in isophthalic acid from said terephthalic acid residue, and recovering isophthalic acid from said extract.

4. A process as defined in claim 3 wherein said solvent is employed in a ratio of between 10 and 40 ml. per gram of isophthalic acid in said mixture.

References Cited in the file of this patent

UNITED STATES PATENTS 2,531,173   Toland _____ Nov. 21, 1950

FOREIGN PATENTS 623,836   Great Britain _____ May 24, 1949

OTHER REFERENCES

Fittig et al.: Liebigs Ann., vol. 148, pp. 11–23 (1886).
Meyer: Liebigs Ann., vol. 156, p. 276 (1871).
Richter: Ber. Deut. Chem., vol. 6, pp. 877–878 (1873).
Ullman et al.: Ber. Deut. Chem., vol. 36, p. 1798 (1903).
Kuhn et al.: Helv. Chim. Acta, vol. 11, p. 47 (1928).